Oct. 21, 1952 M. A. BEAUPRE 2,614,638
SPINNER SEAL AND FAIRING
Filed April 9, 1947 2 SHEETS—SHEET 1

INVENTOR.
Merle A. Beaupre
BY James M. Clark
Attorney

Oct. 21, 1952  M. A. BEAUPRE  2,614,638
SPINNER SEAL AND FAIRING
Filed April 9, 1947  2 SHEETS—SHEET 2

INVENTOR.
Merle A. Beaupre
BY
James M. Clark
Attorney

Patented Oct. 21, 1952

2,614,638

UNITED STATES PATENT OFFICE 2,614,638

SPINNER SEAL AND FAIRING

Merle A. Beaupre, Santa Monica, Calif., assignor to North American Aviation, Inc.

Application April 9, 1947, Serial No. 740,312

2 Claims. (Cl. 170—160.23)

The present invention relates broadly to the reduction in resistance of aircraft components and more particularly to the fairing and sealing of the intersections of propeller blade roots with spinners, cowls and the like.

The fairing and sealing of the gaps at the intersection of propeller blade roots and the outer streamlined surfaces of spinners and cowlings through which the blades pass have given rise to problems for which prior efforts have not provided entirely satisfactory solutions. These problems have been augmented to a great extent by the irregularity of the intersection of the blade cross-section and the surface of revolution comprising the spinner or cowl, and the necessarily irregular shape of the fairing and seal. The necessity of adjusting the blade pitch of variable pitch propellers has also contributed considerably to this problem in order that a substantially faired and streamlined surface is provided in all positions of adjustment of the propeller blades. In providing a suitable fairing and seal at the junction of the spinner with the propeller blade, there is an urgent necessity for a simple, lightweight readily serviced fairing. These conditions are particularly important in installations of propellers in aircraft of relatively high power and speed, and airflow in a radial direction into or out of the spinner can frequently prove very objectionable and disturbing to the airflow over the spinner and cowling, whether this air be utilized for engine cooling purposes, or not.

It is accordingly a principal object of the present invention to provide a relatively simple, low-cost and effective fairing and seal for the intersection of a spinner cowling and the shank of a propeller blade. It is a further object to provide such a seal and fairing which is flexible and easily attached, as well as one which will permit of a wide variation of blade pitch adjustments of the propeller. It is a still further purpose of the present invention to provide a fairing and seal which substantially continues the outer streamline surface of a spinner cowl into the irregular intersection with the surface of a propeller blade shank or root. Other objects and advantages will become apparent to those skilled in the art after reading the present description taken together with the accompanying drawings, forming a part hereof, in which:

Figure 1:
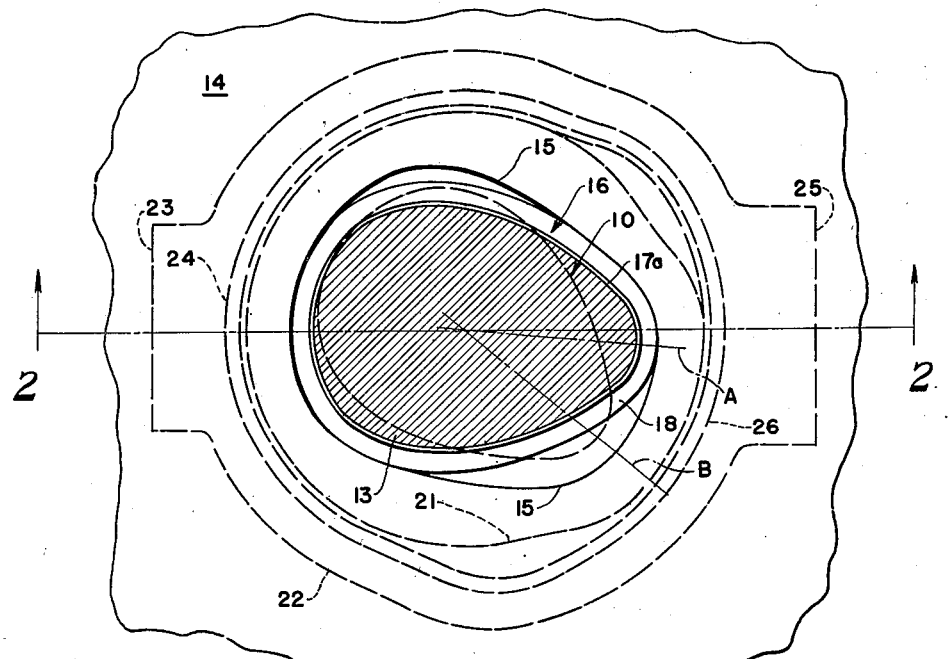
Figure 1 is a fragmentary plan view of a spinner cowling showing a propeller blade shank in section passing through an opening in the spinner and to which a form of the improved seal and fairing of the present invention has been applied.
Figure 2:
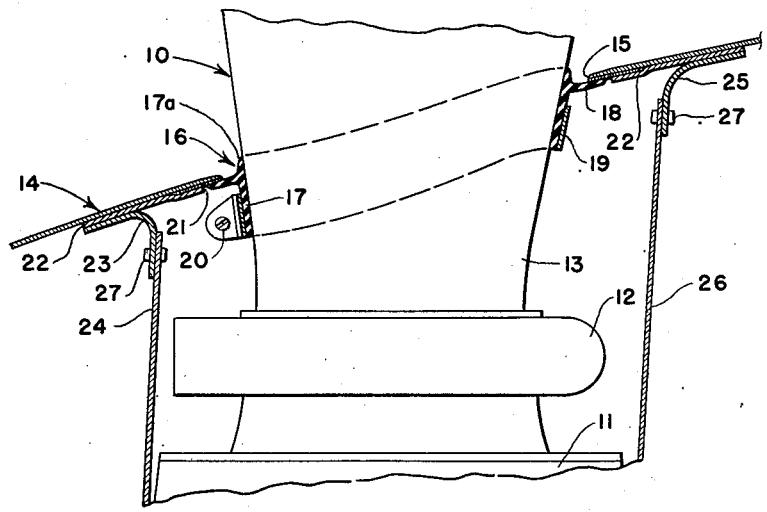
Figure 2 is a cross-sectional elevation of the spinner and propeller blade as taken along the lines 2—2 of Figure 1.
Figure 3:
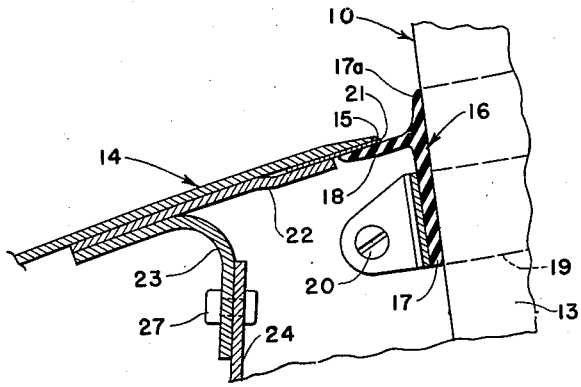
Figure 3 shows an enlarged sectional view of the fairing and seal shown in Figures 1 and 2.

Referring now to Figures 1 to 3 inclusive, the blade of a propeller is indicated by the numeral 10 extending radially outwardly from its hub mounting 11 and through its clamp ring 12, which holds a split sleeve on the blade in the propeller installation shown in the drawings. The shank or root portion of the propeller blade is indicated by the numeral 13 and it may have a cross-section such as shown in Figure 1. The blade 10 is capable of being adjusted in pitch during flight through suitable mechanism within the hub casing 11 and the limits of its pitch adjustment are indicated in Figure 1 by the positions A and B. In order to reduce the drag or resistance of the propeller shaft and its hub mounting, it is faired within a spinner cowling 14 which tapers forwardly in the usual manner to a pointed or sharply round nose portion and has provided through its wall surface, openings such as 15 to accommodate the blades of the propeller assembly. In order to prevent airflow in a radial direction into or out through the opening 15, and to provide a flush seal substantially continuous with the surface of the spinner, a combined seal and fairing of molded synthetic rubber, or similar composition, is provided as indicated at 16. The molded rubber fitting 16 is comprised of a cylindrical wall or collar portion 17, which preferably contains a cotton-webbing reinforcement, or an integral insert of similar flexible material. Its upper periphery at 17a is formed with a tapering portion which is preferably of the order of one thirty second of an inch undersized all around with respect to the adjacent section of the propeller blade root in order to insure a snug fit. The member 16 also has integrally molded therewith an outwardly extending flange portion 18. The wall portion 17 of the molded fitting 16 is retained upon the blade shank 13 by means of the metal clamp or collar 19 and the tightening screws 20 at its lug portion. A relatively thin metallic flange member 21, preferably formed from thin sheet steel shim stock is bonded, or otherwise secured, to the outer portion of the upper face of the flange 18 of the molded fitting. The opening within this substantially annular metal flange element 21 preferably coincides with the opening 15 in the spinner shell, and the outer portion of the element 21 is guided by, and journaled within, the inwardly crimped or offset portion of the seal retaining strip 22.

The spinner 14 is preferably provided with a bulkhead or diaphragm member 24 and a flanged member 23 by which it is attached to the bulkhead and the lower face of the seal retainer member 22 on the leading side of the propeller, and a similar bulkhead 26 and connecting flange 25 is attached between the retaining strip and the bulkhead on the trailing side of the propeller. The outer connections between the angle-shaped strips 23 and 25 are preferably welded to the retaining strip 22, and may be riveted as by the rivets 27 to the radially extending bulkheads 24 and 26. It will accordingly be noted that with the wall portion 17 of the fitting 16 secured to the blade shank 13 and with its outwardly extended flange 18 and the attached sealing strip 21 free to rotate within the offset portion of the retaining strip 22, a seal of the opening is provided at all of the positions of blade adjustment between such angles as those indicated at position A and B. The strip 21 is of sufficient flexibility as to permit its being bent laterally to follow the surface of the spinner 14. The outwardly extending flange 18 of the molded fitting is also of sufficient flexibility to permit it to follow the surface contour of the spinner and serves to pull the sealing strip 21 around with it as the blade is adjusted in pitch to at all times provide a faired continuation of the spinner streamline surface while providing a seal against the entry or exit of air flowing through the opening 15.

Figure 4:
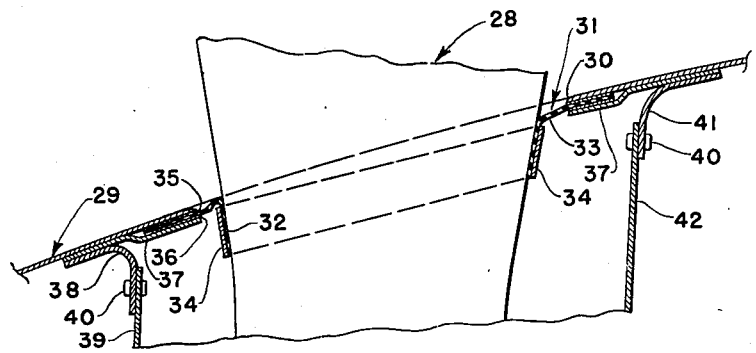
Figure 4 is a similar sectional view as that in Figure 2, but showing a modified form of fairing seal.
Figure 5:
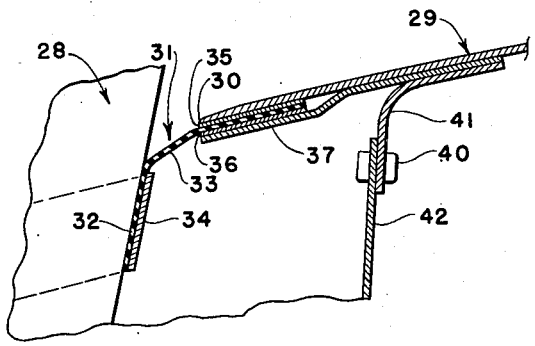
Figure 5 is an enlarged detailed view of the modification shown in Figure 4.

Referring now to Figures 4 and 5, there is shown a modification of the present combined fairing and seal which is made from a sheet of synthetic rubber or similar composition as distinguished from the previously described molded fitting. The propeller blade shank is indicated by the numeral 28 extending outwardly through the opening 30 in the spinner 29. The sheet fairing seal is indicated at 31, having a collar portion 32 adapted to fit closely against the blade shank and an outwardly extending flange portion 33. The cylindrical or collar portion 32 is fastened securely to the blade shank by the clamping rings 34, and the flange portion 33, adjacent thereto has bonded or otherwise securely adhered to both sides of it, the thin sheet steel flexible sealing elements 35 and 36. These elements are preferably made from relatively thin and flexible sheet steel shim stock and are adapted to slidingly fit within the guide formed beneath the spinner shell 29 by the offset or crimped retaining strip 37.

As in the case of the earlier modification the spinner cowl is provided with an internal stiffening structure comprising the angularly bent connection 38 and the radial bulkhead 39 at the forward side of the propeller and a similar, but more outwardly extending internal structure, is formed by the angularly bent plate connection 41 and the vertical bulkhead sheet 42. These elements are interconnected on both sides of the propeller by the rivets 40 and the angle sheets 38 and 41, being welded or otherwise connected by a suitable flush attachment means to the outer wall of the spinner 29. It will accordingly be seen that the combined fairing seals of the latter modification will provide a means for fairing and sealing the opening in a spinner cowl.

This sheet seal functions similarly to the molded fairing seal shown in the earlier modification although somewhat less effectively in that it does not have a closely fitting upper collar portion conforming to the upper edge 17a of the earlier modification. It has, however, provided a very satisfactory fairing and seal in those installations where fairing seals of the molded type are not available.

Other forms and modifications of the present invention, both with respect to its general arrangement and the details of its respective parts, which may become apparent to those skilled in the art after reading the present description are intended to come within the scope and spirit of this invention as more particularly set forth in the following claims.

I claim:

1. An aircraft propeller construction comprising a spinner cowl having an opening through the wall thereof, a variable pitch propeller blade shank extending radially through the opening in said spinner cowl wall, axially spaced annular transverse bulkheads disposed fore and aft of said radially extending propeller blade shank, a continuous offset retaining element attached to the periphery of the opening in said spinner cowl wall, angular attachment means connecting the peripheries of said transverse bulkheads to the innerside of said spinner cowl wall to provide stiffening support for the opposed edges of said spinner cowl opening and for the continuous offset retaining element attached to the periphery of said opening, fairing-seal means fixedly attached to said propeller blade shank and slidingly retained between the edge of said spinner cowl wall and said continuous offset retaining element, said fairing-seal means formed of molded synthetic composition having a collar portion of slightly lesser dimension than that of said noncircular blade shank for providing a tight fit thereto, said fairing-seal means forming a continuously faired seal of said spinner cowl wall opening around said propeller blade shank for preventing airflow therethrough in a radial direction in each of the positions of adjustment of said variable pitch propeller blade shank.

2. An aircraft propeller construction comprising a spinner cowl having an opening through the wall portion thereof, a variable pitch propeller blade extending radially through the opening in said spinner cowl wall portion, axially spaced annular transverse bulkheads disposed fore and aft of said radially extending propeller blade and within said spinner cowl, a continuous offset retaining strip attached to the periphery of said spinner cowl opening forming a guide recess therewith, angular attachment means connecting the peripheries of said transverse bulkheads to the underside of said spinner cowl wall providing stiffening support for the opposed edges of said spinner cowl opening and for said guide recess, and flexible seal means fixedly attached to said propeller blade and having an extended metallic flange portion slidingly retained within said stiffened guide recess for sealing the said wall opening in the said spinner cowl around said propeller blade to prevent airflow in the radial direction therethrough at all positions of adjustment of said propeller blade.

MERLE A. BEAUPRE.

(References on following page)

REFERENCES CITED

The following references are of record in the file of this patent:

UNITED STATES PATENTS

| Number | Name | Date |
|---|---|---|
| 1,931,723 | Fageol | Oct. 24, 1933 |
| 2,083,992 | Hall | June 15, 1937 |
| 2,289,400 | Woods | July 14, 1942 |
| 2,329,606 | Goodman | Sept. 14, 1943 |
| 2,358,310 | Bebinger | Sept. 19, 1944 |
| 2,379,868 | Curtis | July 10, 1945 |
| 2,421,841 | Lowy | June 10, 1947 |
| 2,498,072 | Dean | Feb. 21, 1950 |

FOREIGN PATENTS

| Number | Country | Date |
|---|---|---|
| 571,989 | Great Britain | Sept. 18, 1945 |
| 882,261 | France | May 28, 1943 |